(12) United States Patent
Kim et al.

(10) Patent No.: US 8,604,406 B2
(45) Date of Patent: Dec. 10, 2013

(54) LOW POWER IMAGE SENSOR ADJUSTING REFERENCE VOLTAGE AUTOMATICALLY AND OPTICAL POINTING DEVICE COMPRISING THE SAME

(75) Inventors: Suki Kim, Seoul (KR); Joon Jea Sung, Seoul (KR); Hee ju Park, Chonlabukdo (KR); ji hoon Shin, Gyeonngi-do (KR)

(73) Assignee: Silicon Communications Technology Co., Ltd, Seoul (KR)

( * ) Notice: Subject to any disclaimer, the term of this patent is extended or adjusted under 35 U.S.C. 154(b) by 1191 days.

(21) Appl. No.: 12/515,367

(22) PCT Filed: Nov. 19, 2007

(86) PCT No.: PCT/KR2007/005806
§ 371 (c)(1),
(2), (4) Date: Jul. 6, 2009

(87) PCT Pub. No.: WO2008/060124
PCT Pub. Date: May 22, 2008

(65) Prior Publication Data
US 2010/0073294 A1    Mar. 25, 2010

(30) Foreign Application Priority Data

Nov. 17, 2006 (KR) .................. 10-2006-0114048
Feb. 9, 2007  (KR) .................. 10-2007-0013504
Nov. 1, 2007  (KR) .................. 10-2007-0110986

(51) Int. Cl.
*H01L 27/00* (2006.01)

(52) U.S. Cl.
USPC ..................................... 250/208.1

(58) Field of Classification Search
USPC .......................................... 250/208.1, 214 DC
See application file for complete search history.

(56) References Cited

U.S. PATENT DOCUMENTS

| | | | | |
|---|---|---|---|---|
| 5,583,659 A * | 12/1996 | Lee et al. | ..................... | 358/3.13 |
| 6,229,133 B1 * | 5/2001 | Hynecek | ..................... | 250/208.1 |
| 6,831,684 B1 * | 12/2004 | Ewedemi et al. | .......... | 348/222.1 |
| 6,873,364 B1 | 3/2005 | Krymski | | |
| 2002/0158920 A1 | 10/2002 | Abrams | | |
| 2004/0263654 A1 | 12/2004 | Lee et al. | | |
| 2005/0200600 A1 | 9/2005 | Lee | | |

FOREIGN PATENT DOCUMENTS

| | | |
|---|---|---|
| EP | 1 333 662 A2 | 8/2003 |
| JP | 2005-267169 | 9/2005 |
| WO | WO 2007/124613 A1 | 11/2007 |

* cited by examiner

*Primary Examiner* — Thanh Luu
(74) *Attorney, Agent, or Firm* — Christensen Fonder P.A.

(57) ABSTRACT

The low power image sensor includes: an image sensing unit which senses light from an object, converts the light into an electric signal, and outputs the electric signal; a comparing unit which receives an electric signal from the image sensor, compares a voltage level of the electric signal with a reference voltage, and outputs an image signal as a 1 bit signal per pixel; and an effective image adjuster which compares bit value distribution of an image signal output from the comparing unit with a preset effective range, and adjusts the reference voltage to output an effective image. Further, an optical pointing device includes: an image sensor which senses light from an object and outputs an image signal; and a motion computing unit which receives the image signal and compares before and after images to calculate a motion vector.

16 Claims, 7 Drawing Sheets

NT1 : The number of effective frame or time   NT2 : The number of ineffective frames or time

LOW POWER IMAGE SENSOR ADJUSTING REFERENCE VOLTAGE AUTOMATICALLY AND OPTICAL POINTING DEVICE COMPRISING THE SAME

PRIORITY CLAIM

The present application is a National Phase entry of PCT Application No. PCT/KR2007/005806, filed Nov. 19, 2007, which claims priority from Korean Application Number 10-2006-0114048, filed Nov. 17, 2006, Korean Patent Application No. 10-2007-0013504, filed Feb. 9, 2007, and Korean Patent Application No. 10-2007-0110986, filed on Nov. 1, 2007, the disclosures of which are hereby incorporated by reference herein in their entirety.

TECHNICAL FIELD

The present invention relates to a low power image sensor adjusting a reference voltage and an optical pointing device having the same, and more particularly to a low power image sensor adjusting a reference voltage automatically to output a reliable 1 bit image signal proper for motion computation and an optical pointing device capable of computing before and after images output from the image sensor to effectively estimate a motion or a click.

BACKGROUND ART

The present invention is related to an optical pointing device and a low power image sensor used therein. In general, an optical mouse or a finger mouse senses a mouse pad or a fingerprint and computes a direction and a speed of motion, thereby accomplishing a pointing function.

A conventional optical or finger mouse includes an image signal processing chip as shown in FIG. 1.

FIG. 1 illustrates an image sensor of sensing image information such as the mouse pad or the fingerprint.

A shutter controller is a circuit for adjusting an integration time for each pixel of the image sensor in order to adjust sensitivity. An analog/digital (A/D) converter is a circuit for converting an analog signal output from the image signal into a digital signal, and generally outputs a more than 4 bit gray scale signal.

A preprocessor converts the more than 4 bit digital image signal into a 1 bit signal to make motion computation easy. Thus, the preprocessor has to have a complicated digital signal processing (DSP) function such as a discrete cosine transform (DCT) for obtaining optimum information about the 1 bit image.

A motion computing unit compares a present image with a previous image to calculate the direction and the speed of the motion. Last, a personal computer (PC) interface transmits information calculated by the motion computing unit to a PC.

To easily calculate the direction and the speed of the motion, the 1 bit image is needed and thus the preprocessor is a necessary element. However, the preprocessor having the complicated DSP function is in need of a large chip area and consumes much power. Particularly, it is required to be small in size, consume less power and process an image rapidly so as to be used in a small mobile device, but the conventional image sensor does not satisfy these requirements.

Further, to employ the optical pointing device as an input device for the small mobile device, it needs to minimize power consumed in the motion computation and to have various input functions such as a click estimation function and the like besides a motion estimation function, but there is a limit in conventional technologies.

SUMMARY OF THE INVENTION

As a method for solving the aforementioned problems of the conventional technologies, there is a need of decreasing a chip area to reduce costs and making an image sensor directly output a 1 bit image to reduce power consumption.

The present invention proposes a method in which a simple comparator is employed as an A/D converter and compares an output voltage of each pixel with a reference voltage, thereby outputting an image signal.

However, it is nearly impossible to determine the reference voltage of the simple comparator such that an optimum image can be obtained. Even if it is possible, mass-productivity is very lowered.

FIG. 2 is a view illustrating a method of realizing a 1 bit image and its realized examples. As shown in FIG. 2, an original image is converted into a vivid 1 bit image through a 4 bit preprocessor. However, if output signals of the image sensor are directly converted into the 1 bit image by the comparator, the obtained images are different according to reference voltages.

To use the simple comparator for obtaining the same high-quality 1 bit image as that obtained by the 4 bit preprocessor, the reference voltage of the comparator has to be properly adjusted according to input images.

Thus, it is difficult to directly output the reliable 1 bit image without the preprocessor in the state that the A/D converter is replaced with the comparator. For this reason, the preprocessor has been used in the conventional technologies even though it occupies a relatively large chip area and consumes relatively much power.

Accordingly, an embodiment of the present invention provides an image sensor in which the conventional A/D converter is replaced with the comparator to directly output the 1 bit image signal, and the optimum reference voltage is automatically adjusted to output the reliable image signal for the motion computation.

Another embodiment of the present invention provides an optical pointing device which minimizes power consumption in the motion computation and performs not only a motion estimation function but also a click estimation function.

An aspect of the present invention is to provide a low power image sensor sensing light from an object and outputting an image signal, the low power image sensor including: an image sensing unit which senses light from an object, converts the light into an electric signal, and outputs the electric signal; and a comparing unit which receives an electric signal from the image sensor, compares a voltage level of the electric signal with a reference voltage, and outputs an image signal as a 1 bit signal per pixel.

Particularly, the low power image sensor may further include an effective image adjuster which compares bit value distribution of an image signal output from the comparing unit with a preset effective range, and adjusts the reference voltage to output an effective image.

An aspect of the present invention is to provide a low power image sensor sensing light from an object and outputting an image signal, the low power image sensor including: an image sensing unit which senses light from an object, converts the light into an electric signal, and outputs the electric signal; and a comparing unit which receives an electric signal from the image sensor, compares a voltage level of the electric signal with a reference voltage, and outputs an image signal as a 1 bit signal per pixel.

Thus, the 1 bit image signal is output through a simple comparator, without an A/D converter and a preprocessor of the convention technologies, so that the image sensor is improved in a processing speed and reduced in size.

The low power image sensor may further include an effective image adjuster which compares bit value distribution of an image signal output from the comparing unit with a preset effective range, and adjusts the reference voltage to output an effective image.

The effective image adjuster may include: an effective image determiner which compares a preset effective range with a percentage of '1' or '0' of a bit signal included in an image signal corresponding to total pixels output from the comparing unit, and determines whether an image is effective or not; and a reference voltage adjuster which adjusts the reference voltage if the effective image determiner determines that the image is ineffective.

Through the effective image determiner and the reference voltage adjuster, the reference voltage of the comparing unit is adjusted, thereby maintaining the output of the 1 bit image signal effective for the motion computation.

The effective image determiner may include: a counter which counts the number of '0' or '1' of a 1 bit signal output from the comparing unit with respect to total pixels; and a digital comparator which performs comparison for determining whether the number of '0' or '1' counted by the counter is within a preset range for an effective image and determines whether the image is effective.

The effective image determiner may include: an integrator which integrates '0' or '1' of a 1 bit signal output from the comparing unit with respect to total pixels; and an analog comparator which performs comparison for determining whether the number of '0' or '1' integrated by the integrator is within a preset range for an effective image and determines whether the image is effective.

The effective image determiner may employ a charge pump instead of the integrator.

As described above, the effective image determiner may be configured in various manners such as a digital manner or an analog manner.

The reference voltage adjuster may include a means for determining which one of the numbers of '0' and '1' is higher than the other with respect to a 1 bit signal output from the comparing unit and corresponding to total pixels, and for stepwise adjusting the reference voltage up or down by N times applying a successive approximation register (SAR) method.

The reference voltage adjuster may include: a reference voltage up/down comparator which determines which one of the numbers of '0' and '1' is higher than the other with respect to a 1 bit signal output from the comparing unit and corresponding to total pixels, and decides which one of an up signal and a down signal will be output; and an N-to-$2^N$ decoder which stepwise changes the reference voltage up and down on the basis of the determination of the reference voltage up/down comparator.

The effective image determiner determines whether the image is effective at every time of the SAR method while the reference voltage is adjusted by the N times SAR method, or after completing the SAR method N times while the reference voltage is adjusted by the N times SAR method.

As described above, the reference voltage is adjusted through the SAR algorithm, so that power consumption can be reduced and the reference voltage can be more quickly adjusted into the optimum value.

The reference voltage adjuster may determine which one of '0' and '1' is more than the other in a 1 bit signal output from the comparing unit with respect to total pixels, and change the reference voltage up or down by a minimum unit of adjustment.

The reference voltage adjuster may include: a reference voltage up/down comparator which determines which one of the numbers of '0' and '1' is higher than the other with respect to a 1 bit signal output from the comparing unit and corresponding to total pixels, and decides which one of an up signal and a down signal will be output; and a voltage adjuster which changes the reference voltage up or down according to determination of the reference voltage up/down comparator.

As described above, the adjustment of the reference voltage may not use the SAR method, but the reference voltage may be optimized as being changed up or down by a minimum unit of adjustment.

The reference voltage adjuster may determine which one of the numbers of '0' and '1' is higher than the other with respect to a 1 bit signal output from the comparing unit and corresponding to total pixels, and continuously change a reference voltage up or down.

The reference voltage adjuster may include: a reference voltage up/down comparator which compares a reference value with a value obtained by integrating '0' and '1' of a 1 bit signal output from the comparing unit with respect to total pixels, and decides which one of an up signal and a down signal will be output; and a charge pump which adjusts a reference voltage through charging or discharging according to determination of the reference voltage up/down comparator.

As described above, the adjustment of the reference voltage may be continuously achieved by an analog method.

The image sensing unit may include: a pixel array to sense light from an object and convert the light into an electric signal; and a selector to select a voltage signal of each pixel of the pixel array by a unit of row or column and transmit the selected signal to the comparing unit.

Thus, contrary to the conventional technologies, the electric signal of each pixel is sent to the comparing unit by only a unit of column or row, so that the image sensor is improved in a processing speed and decreased in size.

Meanwhile, the low power image sensor may further include a shutter controller which adjusts an operating frequency of a selector of the image sensing unit to adjust integration time of light incident to a pixel array.

Thus, light integration time may be controlled according to brightness around the image sensor, thereby adjusting sensitivity.

Further, an integrated circuit including the low power image sensor according to an embodiment of the present invention and integrated on a single chip may include at least one function unit of the foregoing low power image sensor. Thus, the low power image sensor may be integrated on the single chip.

Another aspect of the present invention is to provide an optical pointing device including: an image sensor which senses light from an object and outputs an image signal; and a motion computing unit which receives the image signal and compares before and after images to calculate a motion vector, wherein the motion computing unit includes: a temporary storage unit to temporarily store image data output from the image sensor; a comparison unit to compare the image data output from the image sensor with the image data stored in the temporary storage unit; a direction selector to calculate a motion vector from a value output from the comparison unit; and a controller to control operation of the motion computing unit.

Thus, a motion vector detecting method is optimized to thereby provide the optical pointing device which can be driven with low power.

At this time, the image sensor included in the optical pointing device may have one of the aforementioned features.

The motion computing unit may include an operating state selector to determine an operating state of an object with respect to the number of focused effective frames and unfocused ineffective frames to a current image frame or with respect to time.

In the mean time, the operating state selector may determine an operation as a click if the number of effective frames following an ineffective frame or time is smaller than a predetermined critical value $N_0$.

The operating state selector may determine an operation as a double-click if the number of first effective frames following a first ineffective frame or time is smaller than the critical value $N_0$, if the number of second ineffective frames following the first o ineffective frame or time is smaller than a predetermined critical value $N_1$, and if the number of second effective frames following the second ineffective frame or time is smaller than the critical value $N_0$.

The operating state selector may determine an operation as a drag if the number of effective frames following the ineffective frame or time is larger than a predetermined critical value $N_0$.

Thus, the operating state selector may realize the click, the double click and the drag as well as pointing, like a mouse for a PC.

The motion computing unit may include a power controller to control the image sensor and the computing unit to consume minimum power when there is no input, when the object is unfocused, and when the object remains stopped for a predetermined period.

Thus, while the optical pointing device is not in use, the wasteful power consumption is prevented, thereby providing the low power optical pointing device.

Further, the foregoing optical pointing device may be integrated on a single chip.

An aspect of the present invention provides a low power image sensor in which a preprocessor that occupies a relatively large chip area and consumes relatively much power is not needed, so that a cost of an optical pointing image sensor is largely reduced and the power consumption is minimized.

Another aspect of the present invention provides a low power image sensor in which an A/D converter is replaceable with a simple comparator, so that the chip area can decrease to reduce the cost and power consumed in the A/D converter can decrease.

Still another aspect of the present invention provides a reference voltage automatic adjuster to automatically adjust a reference voltage of the comparator according to input images, so that performance of the conventional preprocessor can be accomplished without the preprocessor.

Yet another aspect of the present invention provides an optical pointing device which minimizes power consumption in the motion computation and performs not only a motion estimation function but also a click estimation function.

DETAILED DESCRIPTION

Below, technical configurations for realizing the invention will be described in more detail with reference to accompanying drawings.

The present invention may, however, be embodied in different forms and should not be constructed as limited to the embodiments set forth herein. Rather, these embodiments are provided so that this disclosure will be through and complete, and will folly convey the scope of the invention to those skilled in the art.

I. Configuration and Function of Low Power Image Sensor

To overcome the foregoing limits of the conventional technologies, the present invention newly proposes a low power image sensor of which voltage is automatically adjusted, and which does not need an A/D converter and a preprocessor of an image signal processing chip for an optical mouse or a finger mouse, thereby providing an image processing chip that decreases in a cost and consumes low power.

1. Configuration

Figure 3:
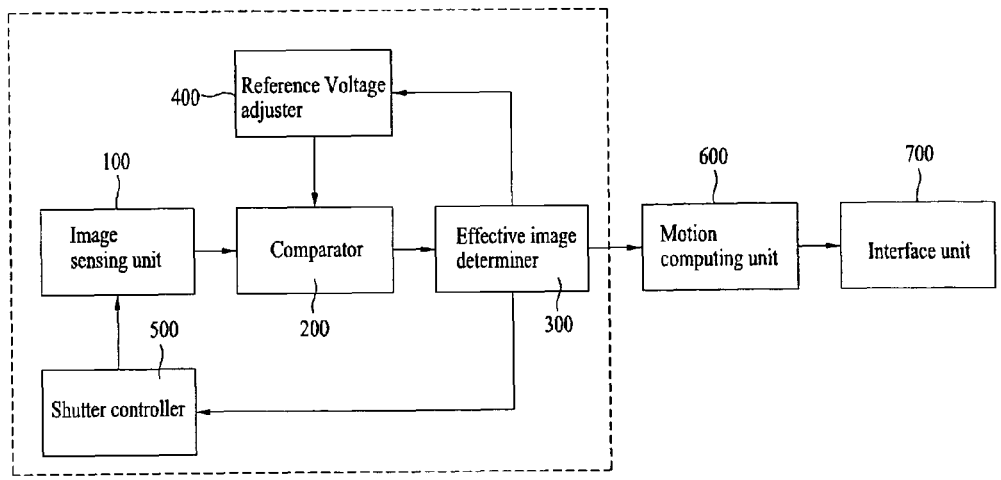
FIG. 3 is a diagram showing an image signal processing chip with a low power image sensor according to an exemplary embodiment of the present invention.

According to an exemplary embodiment of the invention, a low power image sensor of which a reference voltage is automatically adjusted is configured as shown in FIG. 3.

Referring to FIG. 3, the low power image sensor includes an image sensing unit 100, a comparing unit 200, and an effective image adjuster {an effective image determiner 300 and a reference voltage adjuster 400}. In addition, the low power image sensor includes a shutter controller 500 that adjusts an integration time for each pixel of the image sensor so as to adjust sensitivity. If the image sensor of this embodiment is used as a pointing device such as an optical mouse, a finger mouse or the like, the low power image sensor may further include a motion computing unit 600 and an interface unit 700 as shown in FIG. 3.

The image sensing unit 100 senses light from an object and converts it into an electric signal, thereby outputting the electric signal. The comparing unit 200 compares a voltage level of the electric signal received from the image sensing unit 100 with a reference voltage, and outputs an image signal as a 1 bit signal per pixel.

2. Configuration and Function of Image Sensing Unit

Figure 4:
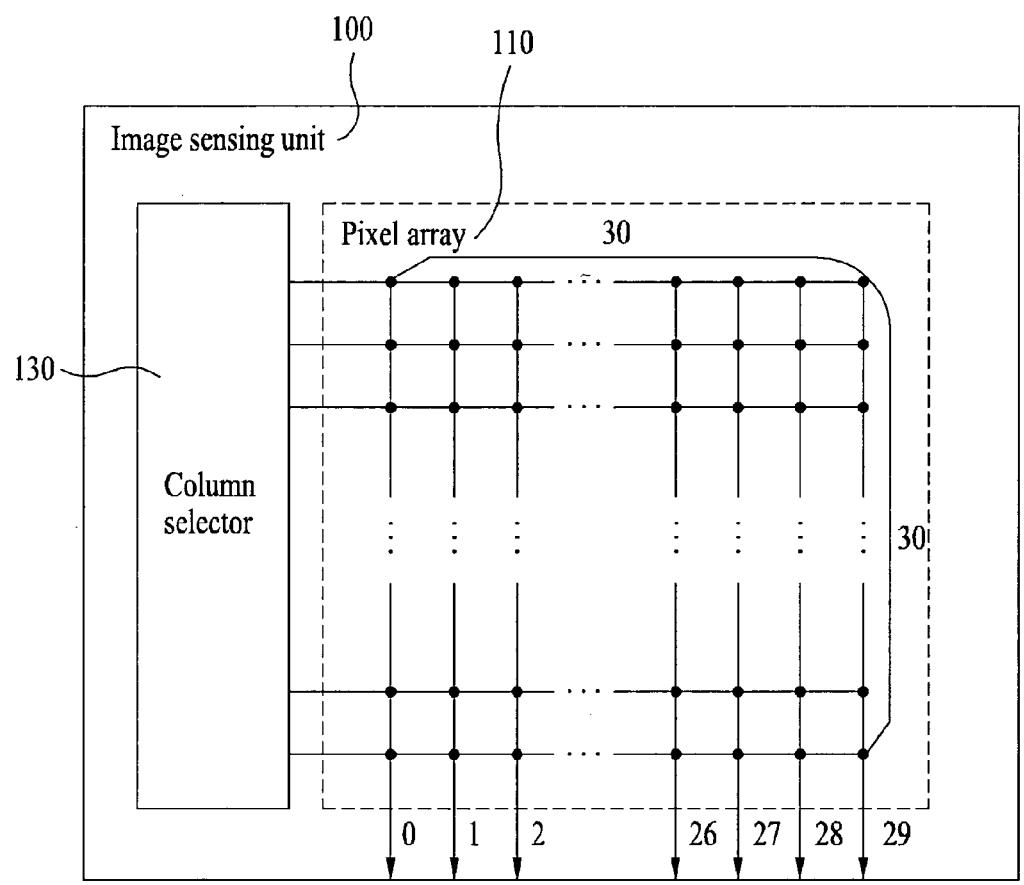
FIG. 4 illustrates an image sensing unit in the low power image sensor according to an exemplary embodiment of the present invention.

As shown in FIG. 4, the image sensing unit 100 includes a pixel array 110 sensing light from the object and converting it into an electric signal, and a selector 130 selecting a voltage signal of each pixel of the pixel array 110 by a unit of row or column and transmitting it to the comparing unit.

A unit pixel of the pixel array 110 having a matrix form may be achieved by a general circuit that includes a photodiode for receiving incident light, and three transistors for outputting the electric signal converted by the photodiode. Alternatively, the unit pixel may have a one-transistor (1-Tr) structure or a four-transistor (4-Tr) structure. Preferably, the pixel array 110 includes at least 900 (i.e., 30×30) pixels to detect a proper optical pointing image.

A voltage signal output from each pixel of the pixel array 110 is selected by the selector 130 and transmitted to the comparing unit 200. Meanwhile, the conventional optical pointing image sensor includes both the column selector and the row selector and outputs an analog signal of a pixel, so that not only it is difficult to process an image but also much power is consumed. On the other hand, according to an exemplary embodiment of the present invention, as shown in FIG. 4, only the column selector 130 is used for transmitting the electric signals of the pixels by the unit of column to the comparing unit 200, so that the power consumption can decrease and the signal can be more rapidly processed. Alternatively, only the row selector may be used instead of the column selector 130.

The comparing unit 200 includes voltage comparators corresponding to the number of rows in the pixel array 110 in consideration of the column-unit signals selected by the column selector 130, and compares a level of a voltage signal output from the pixel array 110 with the level of the reference voltage by the unit of column. If the voltage signal is lower (or higher) than the reference voltage, digital signals of '1' are output in parallel. On the other hand, if the voltage signal is higher (or lower) than the reference voltage, digital signals of '0' are output in parallel. Thus, the output image signal is based on the 1 bit data.

Contrary to the conventional image sensor, the image sensor according to the present invention outputs the 1 bit image signal for each pixel, so that the computing unit processes the 1 bit data. Accordingly, a circuit according to an embodiment of the present invention performs a simple operation, decreases in size, and is driven by low power as compared with that of the conventional image sensor.

In the meantime, the low power image sensor according to an exemplary embodiment of the present invention may further include the shutter controller 500 to adjust the light integration time of each pixel of the image sensing unit 100. Thus, the sensitivity can be controlled by adjusting the light integration time depending on brightness around the image sensor.

The shutter controller 500 adjusts an operating frequency of the column selector 130 in order to change a frame change rate, thereby adjusting the integration time.

Figure 1:
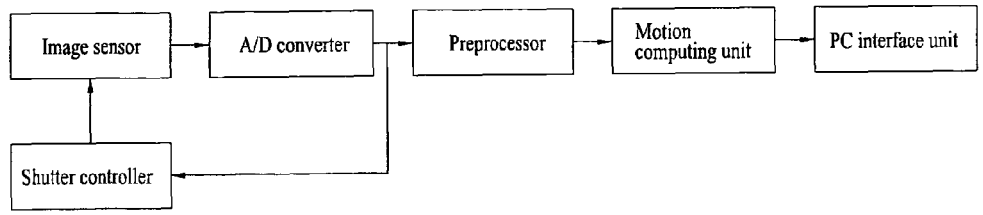
FIG. 1 is a diagram showing an image signal processing chip in a conventional optical mouse.
Figure 2:
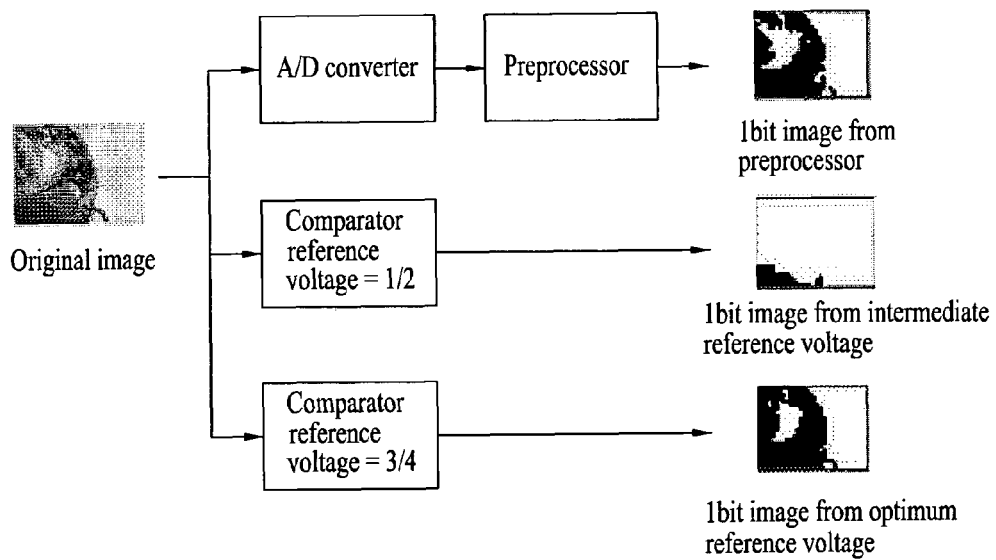
FIG. 2 is a view illustrating a method of realizing a 1 bit image and its realized examples.

3. Configuration and Function of Effective Image Determiner and Reference Voltage Adjuster To use the 1 bit data for precisely transferring an image of an object, it is very important to rapidly and exactly set the optimum value of the reference voltage used in the comparing unit 200 (refer to FIG. 2). In general, the optical pointing image sensor has to detect images more than at least 1000 frames per second, so that rapid image detection is required. Accordingly, it is absolutely necessary for rapidly and exactly setting the optimum reference voltage.

In this embodiment, the effective image adjuster is provided to determine whether an image based on an image signal output from the comparing unit 200 is effective for the motion computation or not, and to output the image signal in case of the effective image but output the image signal, of which the reference voltage is adjusted, not in case of the effective image. In detail, bit value distribution of the image signal output from the comparing unit 200 is compared with a preset effective range, and then the reference voltage is adjusted, thereby outputting the effective image. The effective image adjuster includes the effective image determiner 300 and the reference voltage adjuster 400.

Below, such exemplary configurations of the present invention will be described with their functions.

In the exemplary embodiment of the present invention compared to the conventional technologies, the A/D converter is replaced by the comparing unit 200. Further, the effective image determiner 300 and the reference voltage adjuster 400, which receives feedback from the effective image determiner 300 and adjusts the reference voltage of the comparing unit 200, are used instead of the preprocessor.

Figure 5:
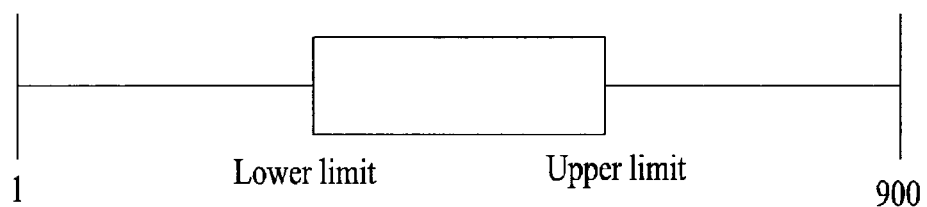
FIG. 5 shows a range of an effective image for effective motion computation, i.e., the range of the number of '1' or '0' among 1 bit signals of total pixels.

The effective image determiner 300 compares the preset effective range with a percentage of '1' or '0' of a bit signal included in the image signal corresponding to total pixels output from the comparing unit 200, and determines whether the output image is the effective image or not. The effective image is defined as the number of '0' and '1' in the 1 bit image corresponding to total pixels varies within a predetermined range (refer to FIG. 5).

In the case of the effective image, a control signal for maintaining the current reference voltage is transmitted to the reference voltage adjuster 400, and the 1 bit image signal output from the comparing unit 200 is sent to the motion computing unit 600. In the case of an ineffective image, it is determined which one of the numbers of '0' and '1' is higher than the other, and the reference voltage adjuster 400 is controlled according to the determined result to increase or decrease the reference voltage of the comparing unit 200, thereby allowing the number of '0' and '1' to be included within the effective range.

Until the 1 bit image is within the effective range, the ineffective 1 bit image is not transmitted to the motion computing unit 600, so that it is determined that there is no motion. The reference voltage adjuster 400 may be achieved by a digital to analog converter (DAC) in case of a discrete type, or a charge pump in case of an analog type.

*3-1. Configuration and Function of Effective Image Determiner

According to an exemplary embodiment of the present invention, the configuration of the effective image determiner may be accomplished variously, and below its various embodiments will be described in detail.

3-1-1. Effective Image Determiner with Digital Counter and Digital Comparator

Figure 6:
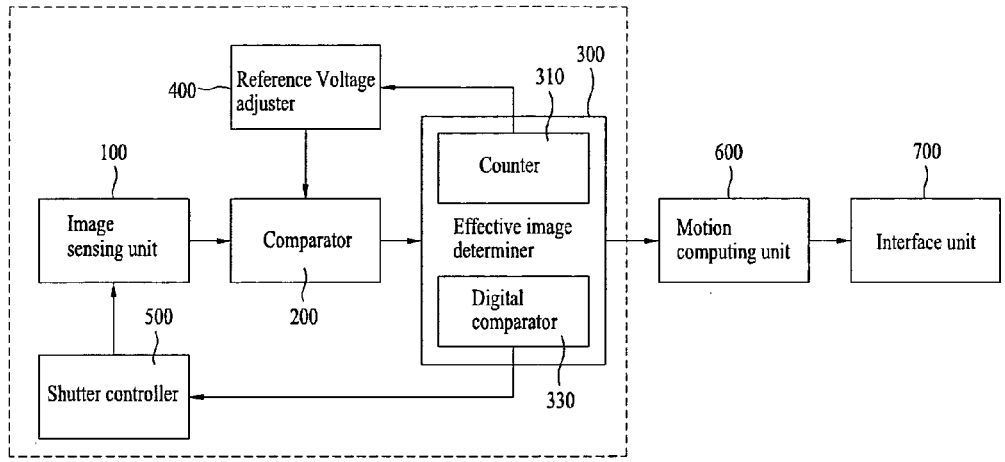
FIGS. 6 and 7 are detailed configurations of the image signal processing chip with the low power image sensor according to an exemplary embodiment of the present invention.

In this embodiment, as shown in FIG. 6, the effective image detector 300 includes a digital counter 310 and a digital comparator 330. The counter 310 counts the number of '0' or '1' of the 1 bit signal output from the comparing unit 200 with respect to total pixels, and the digital comparator 330 performs comparison for determining whether the number of '0' or '1' counted by the counter 310 is within the optimum range for the effective image, thereby determining whether the image is effective or ineffective.

In the case of the effective image, the reference voltage is maintained without adjustment, and the 1 bit effective image output from the comparing unit 200 is sent to the motion computing unit 600.

In the case of the ineffective image, the reference voltage adjuster 400 compares the number of '0' and '1' with a reference value (that is, determines which one of the numbers of '0' and '1' is higher than the other), and correspondingly adjusts the reference voltage. A method of adjusting the reference voltage includes an SAR type ADC and an analog type charge pump, which will be described later.

The present embodiment is realized as follows. If the image sensor includes 1000 pixels, the 1000-countable counter 310 counts the number of '0' or '1' in 1000 pixels. In the case where the effective image is defined as the number of '0' or '1' ranges from 400 to 600, the digital comparator 330 determines whether a counter output ranges between 400 and 600, thereby determining whether the current image is effective or not. In the case of the ineffective image, a command to adjust the reference voltage is given to the reference voltage adjuster 400.

3-1-2. Effective Image Determiner with Analog Integrator and Analog Comparator

Figure 7:
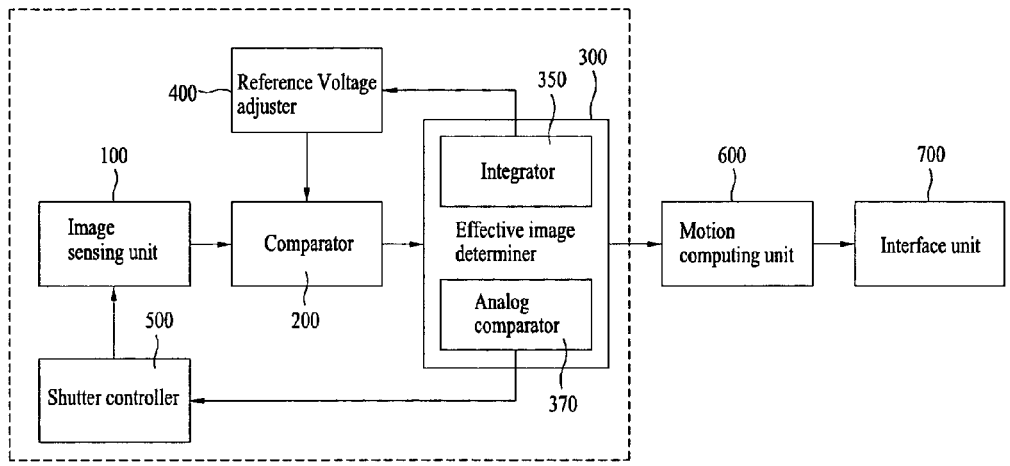

In this embodiment, as shown in FIG. 7, the effective image detecter 300 includes an integrator 350 and an analog comparator 370. The integrator 350 integrates '0' or '1' of the 1 bit signal output from the comparing unit 200 with respect to total pixels and converts the integrated value into an analog signal. The analog comparator 370 performs comparison for determining whether the range of '0' or '1' integrated by the integrator 350 is within the optimum range for the effective image, thereby determining whether the image is effective or ineffective.

In the case of the effective image, the reference voltage is maintained without adjustment, and the 1 bit effective image output from the comparing unit 200 is sent to the motion computing unit 600.

In the case of the ineffective image, the reference voltage adjuster 400 compares the number of '0' and '1' with a reference value (that is, determines which one of the numbers of '0' and '1' is higher than the other), and correspondingly adjusts the reference voltage. A method of adjusting the reference voltage includes an SAR type ADC and an analog type charge pump, which will be described later.

Figure 8:
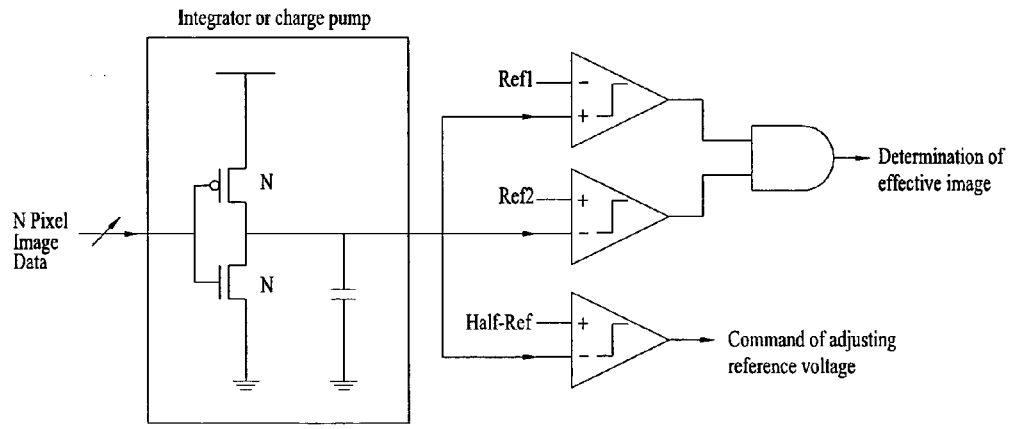
FIG. 8 shows an example of an analog type effective image determiner in the low power image sensor according to an exemplary embodiment of the present invention.

The present embodiment is realized as follows. As shown in FIG. 8, 1000 image outputs are applied to the integrator or the charge pump circuit, thereby converting the number of '0' or '1' into the analog signal. Then, the analog comparator the converted analog voltage is within a level corresponding to the number of '0' or '1' ranging between 400 and 600, thereby determining whether the current image is effective or not. In the case of the ineffective image, a command to adjust the reference voltage is given to the reference voltage adjuster 400.

3-2. Configuration and Function of Reference Voltage Adjuster 3-2-1. Discrete Type Reference Voltage Adjustment Using SAR Algorithm According to an exemplary embodiment of the present invention, an algorithm used in a SAR type ADC is employed as a method for adjusting the reference voltage. According to an exemplary embodiment of the present invention, the reference voltage adjuster using such an algorithm includes a means for determining which one of the numbers of '0' and '1' is higher than the other with respect to the 1 bit signal output from the comparing unit and corresponding to total pixels, and for stepwise adjusting the reference voltage up or down by N times applying a successive approximation register (SAR) method.

Such a reference voltage adjuster may include a reference voltage up/down comparator and an N-to-$2^N$ decoder. The reference voltage up/down comparator determines which one of the number of '0' and '1' is higher than the other with respect to the 1 bit signal output from the comparing unit and corresponding to total pixels, and decides which one of an up signal and a down signal will be output. The N-to-$2^N$ decoder stepwise changes the reference voltage up and down on the basis of the determination of the reference voltage up/down comparator.

Below, a method of using the SAR method to adjust the reference voltage will be described with reference to FIG. 9.

Figure 9:
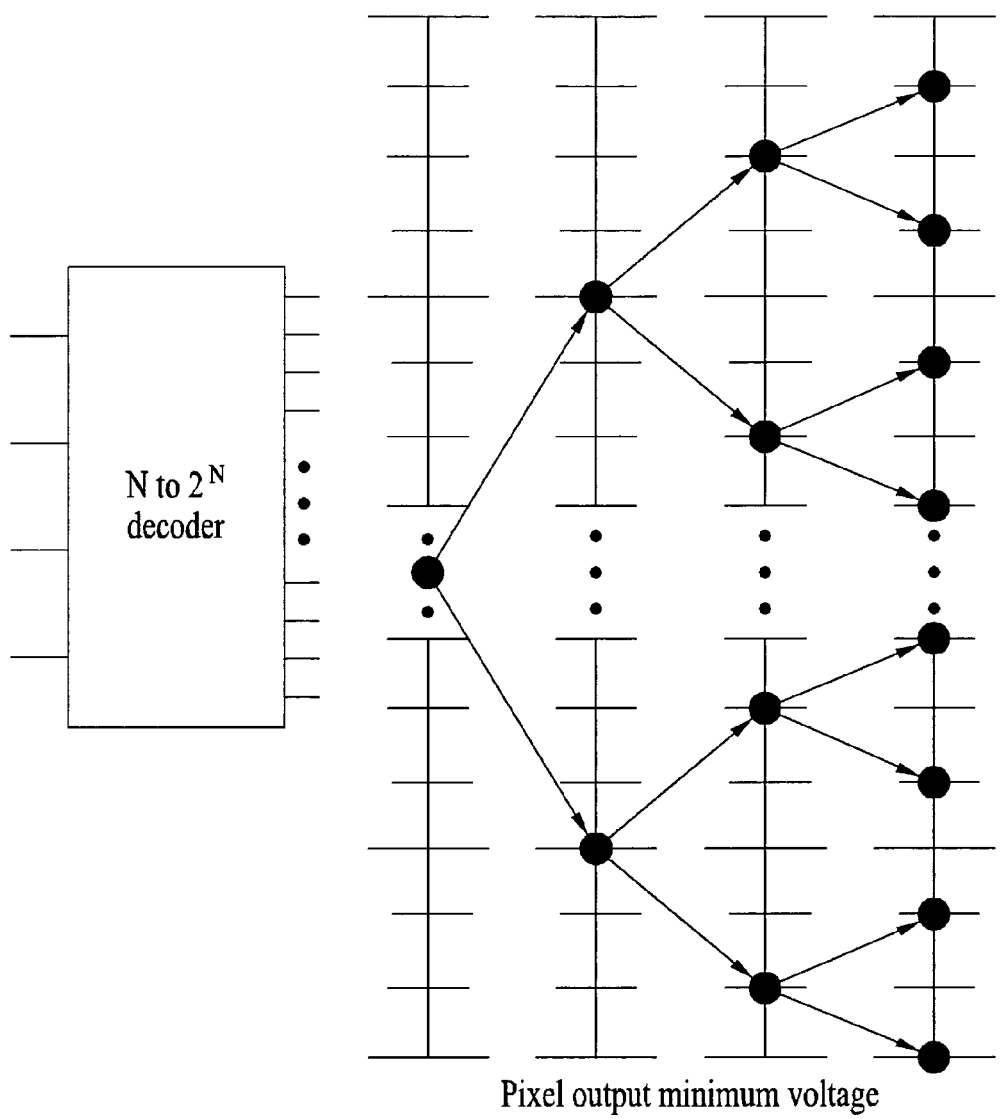
FIG. 9 is a mimetic diagram for explaining a method of adjusting a reference voltage through a successive approximation register (SAR) algorithm in the low power image sensor according to an exemplary embodiment of the present invention.

As shown in FIG. 9, the 1 bit image signal corresponding to total pixels is received through the comparing unit that receives an initial image from the image sensor and compares it with an intermediate reference voltage, and it is determined which one of the number of '0' and '1' is higher than the other, thereby changing the intermediate reference voltage into its ¼ or ¾ level.

Thereafter, the 1 bit image signal corresponding to total pixels is received through the comparing unit that compares the signal output from the image sensor with the changed reference voltage, and it is determined which one of the number of '0' and '1' is higher than the other, thereby changing the reference voltage as shown in FIG. 9. By repeating these processes N times, the reference voltage is precisely adjustable in 2 steps. For example, if N is 4, the algorithm results in the same effect as the conventional 4 bit preprocessor.

Thus, the adjustment of the reference voltage basically undergoes the SAR algorithm, but the method of determining the effective image and adjusting the reference voltage so as to output the 1 bit effective image signal may vary as follows.

3-2-1-1. Determination of Effective Image Every Time after Ending SAR Algorithm

At an initial operation, while the optimum reference voltage is set through N-times SAR algorithm, determination of the effective image is performed at every time, and the algorithm is processed only when the image is not effective.

According to every time determination of the effective image, when it is determined that the image is effective, the reference voltage is not adjusted any more through the SAR algorithm and the reference voltage is maintained to output successive image signals. Then, when it is determined that the image is not effective any more, the SAR algorithm is processed again, thereby resetting the reference voltage.

3-2-1-2. Determination of Effective Image after Processing SAR Algorithm N Times At an initial operation, the SAR algorithm is compulsorily processed N-times to set the optimum reference voltage, and it is determined that the final 1 bit image signal is effective for computing motion.

After processing the SAR algorithm N times, if it is determined that the image is effective, the successive image signals are output while maintaining the reference voltage at a set value. On the other hand, if it is determined that the image is not effective even after processing the SAR algorithm N times, the SAR algorithm is processed again N times.

In the case that the effective image is determined after completing the SAR algorithm N times, it is possible to obtain the optimum reference voltage always. Since the SAR algorithm has to be processed N times when the i, a certain time is required until the motion is computed. On the other hand, in the case that the effective image is determined every time after ending the SAR algorithm, if it is determined that the image is effective while processing the SAR algorithm, the SAR algorithm is not driven any more and the motion is computed, thereby more quickly computing the motion than the former. However, in the latter case, the reference voltage may not have an optimum value.

3-2-2. Discrete Type Adjustment of Reference Voltage without Using SAR Algorithm As a method with no use of the SAR algorithm, there is a method of changing the reference voltage up and down to find the optimum reference voltage.

Referring to FIG. 9, an initial reference voltage is set to '½' and then the reference voltage is changed up and down by a minimum variable 1/N step, thereby finding the optimum reference voltage.

This method takes much time to find the optimum reference voltage if the optimum reference voltage is the maximum value or the minimum value of a variable voltage. However, if the optimum reference voltage approximates an intermediate value, this method finds the optimum reference voltage more quickly than the SAR algorithm.

Every time when the reference voltage is changed up/down little by little, it is determined whether the image is effective or ineffective, thereby determining whether the reference voltage is optimized or not. If it is determined that the image is effective, the reference voltage is not adjusted any more, and the following successive 1 bit image signals are output. On the other hand, if it is determined that the image is ineffective, a process for changing the reference voltage up/down is continued.

3-2-3. Continuous Type Adjustment of Reference Voltage

The hitherto described method determines whether the signal output from the image sensing unit includes the effective image or not, and adjusts the reference voltage through the DAC by the discrete method.

The determination of the effective image was described together with two methods including the method using the digital counter and the digital comparator, and the method using the analog integrator and the analog comparator. Further, the adjustment of the reference voltage based on the determination of the effective image was described together with the SAR algorithm and the up/down algorithm for the discrete adjustment using the DAC. Besides, there is a continuous method of forming negative feedback in an absolute analog manner to adjust the reference voltage.

The aforementioned methods all use the DAC in the discrete manner to adjust the reference voltage. However, the determination of the effective image may be accomplished by the digital method or the analog method as shown in FIGS. 6 and 7.

In this embodiment, the reference voltage adjuster is configured such that the reference voltage is adjusted in not the discrete manner but the continuous manner.

In the foregoing embodiments, the SAR method and the up/down method are used to adjust the reference voltage in the discrete manner. However, in the present embodiment, the charge pump is used to adjust the reference voltage in the continuous manner.

In this case, the reference voltage adjuster determines which one of the numbers of '0' and '1' of the 1 bit signal corresponding to total pixels output from the comparing unit is higher than the other, and includes a reference voltage up/down comparator and a voltage adjuster. The reference voltage up/down comparator determines which one of an up signal or a down signal will be output with respect to the reference voltage. Further, the voltage adjuster stepwise adjusts the reference voltage to have an optimum value by changing the reference voltage up or down according to the determined results of the reference voltage up/down comparator.

Figure 10:
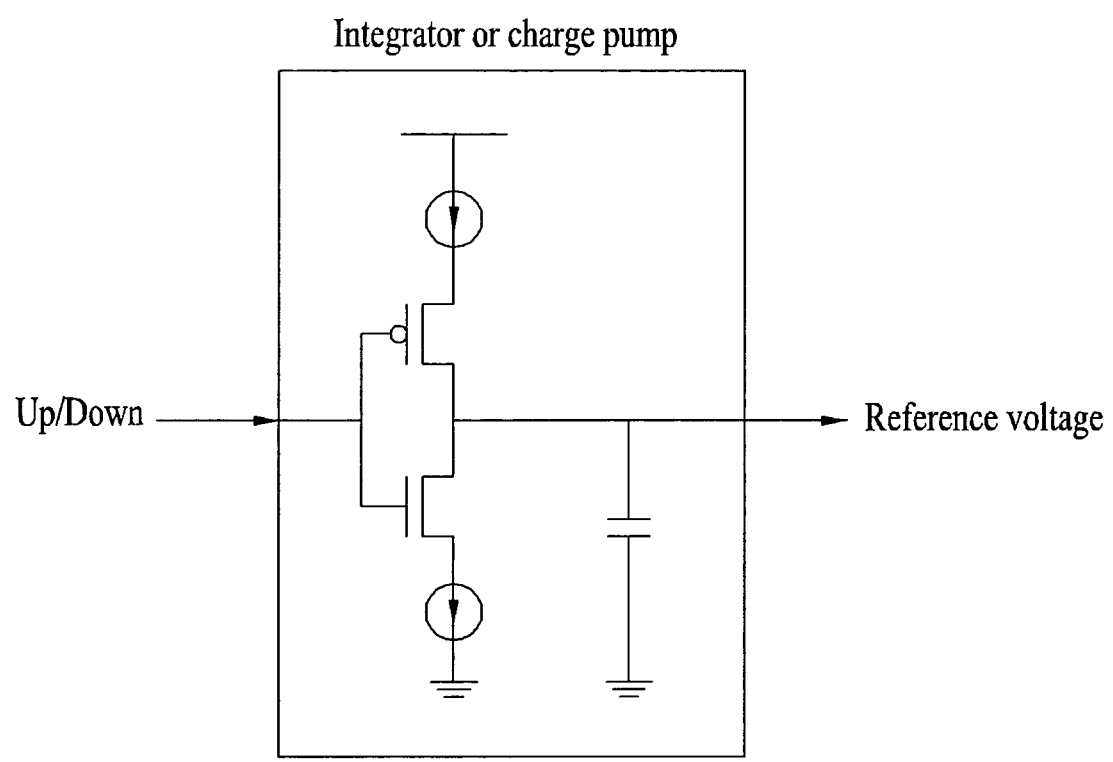
FIG. 10 shows an example of an analog type reference voltage adjuster in the low power image sensor according to an exemplary embodiment of the present invention.

According to the present embodiment, it is determined which one of the numbers of '1' and '0' is higher than the other in the digital data output from the comparing unit, thereby outputting an up/down command. Accordingly, a charge/discharge or discharge/charge command is given to the charge pump, thereby adjusting the reference voltage of the charge pump in such a continuous manner that the number of '0' and the number of '1' are approximately equal to each other. FIG. 10 is a circuit diagram exemplary illustrating an analog type reference voltage adjuster that adjusts the reference voltage in the continuous manner.

In this manner, the reference voltage adjuster may employ the charge pump (or integrator), and the effective image determiner may use the foregoing digital or analog method.

Ii. Optical Pointing Device with Low Power Image Sensor

1. Basic Configuration

An optical pointing device according to an exemplary embodiment of the present invention optimizes a motion vector detecting method and allows an input like a mouse in a portable device. In other words, according to an exemplary embodiment of the present invention provides an input device typed of a mouse which is used in an operating system (OS) for a portable device that requires all directional motions instead of a conventional navigation key and in a personal computer (PC) corresponding to change in a visual interface. In case of a desktop PC, an optical mouse using an optical sensor and a track ball have been widely used. In case of a notebook computer, a touch pad or a jog has been widely used. However, such a pointing device is not proper to the portable device.

Accordingly, the present invention provides an efficient algorithm for estimating motion of an object (e.g., fingers or the like) through an image pickup sensor to calculate a motion vector, and a device to be used as an input unit for the portable device.

Specifically, the present invention provides an optical pointing device which minimizes power consumption in the motion computation and performs not only a motion estimation function but also a click estimation function.

Such an optical pointing device includes an image sensor sensing light from an object and outputting an image signal; and a motion computing unit 600 receiving the image signal and comparing before and after images to calculate the motion vector.

The motion computing unit 600 includes a temporary storage unit 620 to temporarily store the image data output from the image sensor; a comparison unit 610 comparing the image data output from the image sensor with the image data stored in the temporary storage unit 620 to obtain difference between the before and after images; a direction selector 630 calculating the motion vector based on a value output from the comparison unit 610; and a controller 640 controlling the motion computing unit 600. Further, the motion computing unit 600 may further include an operating state selector 650 or a power controller 660, which will be described later.

Figure 11:
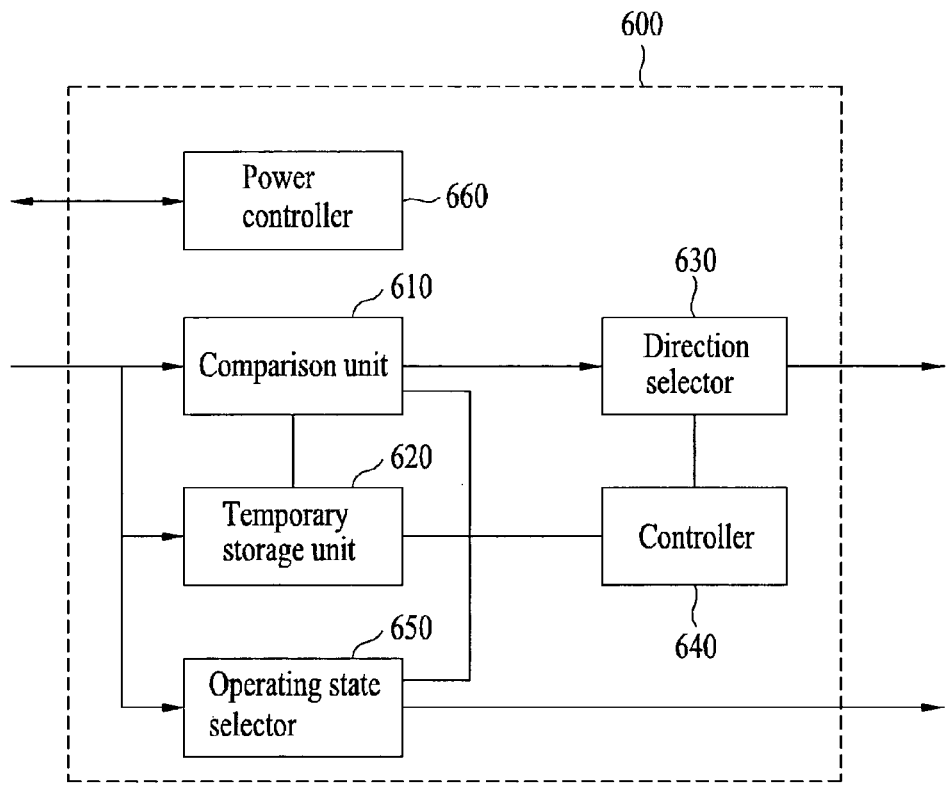
FIG. 11 is a block diagram of a computing unit in an optical pointing device according to an exemplary embodiment of the present invention.

FIG. 11 shows a configuration of the computing unit in the optical pointing device according to an exemplary embodiment of the present invention.

The optical pointing device according to this embodiment may be connected to and used for the portable device. In this case, the optical pointing device may further include an interface to be connected with the portable device in addition to the motion computing unit. Here, a mobile phone, a personal digital assistant (PDA), a notebook computer, a digital camera, an MP3 player, or the like may be used as the portable device.

The optical pointing device according to this embodiment is preferably fabricated into a single integrated circuit, thereby realizing a smaller sized input device.

In the motion computing unit 600, the comparison unit 610 compares the current image data output from the image sensor with the previous image data stored in the temporary storage unit 620. For example, the comparison unit 610 includes an XOR operator of performing an XOR operation, and a pattern comparison unit of receiving an output from the XOR operator and finding the minimum pattern difference between the before and after images.

The comparison unit 610 finds the pattern difference of the image while moving the current image by one pixel with respect to the previous image.

The controller 640 of the motion computing unit 600 controls each function block.

For example, the controller 640 may include a critical value register for setting the image sensor to have a critical value proper to peripheral environments, and a light source intensity register for adjusting light intensity of the image sensor.

In the optical pointing device according to an exemplary embodiment of the present invention, the motion computing unit 600 includes the operating state selector 650 to achieve an input method such as a click, a drag, etc. like a computer mouse.

Figure 12:
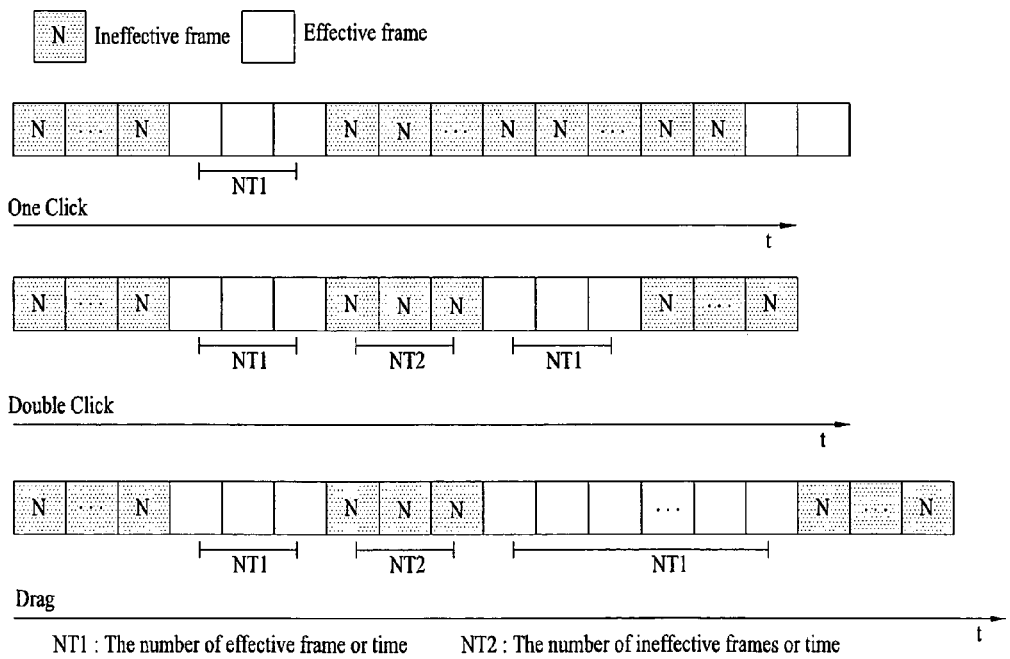
FIG. 12 illustrates that operation is determined according to effective or ineffective frames in an operating state controller of the optical pointing device according to an exemplary embodiment of the present invention.

FIG. 12 illustrates that operation is determined according to effective or ineffective frames in the operating state controller of the optical pointing device according to an exemplary embodiment of the present invention.

The operating state selector 650 determines the operating state of an object on the basis of the number of focused and unfocused effective frames or time with respect to the current image frame.

As shown in FIG. 12, the operating state selector 650 determines an input as one-click operation if the number of effective frames following an ineffective frame or time is smaller than a predetermined critical value $N_0$, with respect to the current image frame. Further, the operating state selector 650 determines an input as a double-click operation if the number of first effective frames following a first ineffective frame or time is smaller than the critical value $N_0$, if the number of second ineffective frames o following the first ineffective frame or time is smaller than a predetermined critical value $N_1$, and if the number of second effective frames following the second ineffective frame or time is smaller than the critical value $N_0$, with respect to the current image frame. Also, the operating state selector 650 determines an input as a drag operation if the number of effective frames following the ineffective frame or time is larger than a predetermined critical value $N_0$, with respect to the current image frame. Here, the critical values $N_0$ and $N_1$ are register values which may be freely set by a user.

Further, the motion computing unit 600 according to an exemplary embodiment of the present invention includes the power controller 660 to reduce power wastefully consumed in an idle state where there is no input.

The power controller is very important for low power design adapted to the input unit of the portable device.

The input unit has to remain always turned on since it is impossible to expect when information is input. Particularly, in the case where the image pickup sensor is used instead of a button type input unit, much power is consumed in the idle state.

Accordingly, the present invention provides a hardware block for controlling power supplied to a light source provided in the sensing unit and power supplied to the sensing unit. Here, if there is no input for a predetermined period, the sensor enters the idle state, thereby minimizing the power consumption.

The power controller 660 controls the image pickup sensor and the computing unit to consume the minimum power when there is no input, when the object is unfocused even if there is an input, and when the object remains stopped for a predetermined period even if the object is focused.

Figure 13:
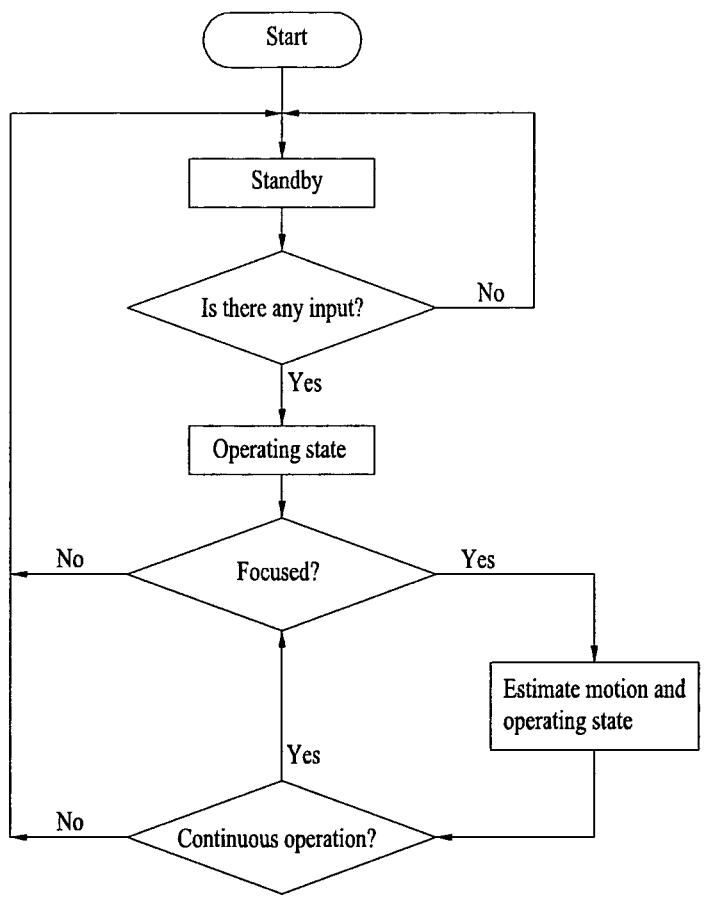
FIG. 13 is a flowchart showing operation of a power controller in the optical pointing device according to an exemplary embodiment of the present invention.

FIG. 13 is a flowchart showing operation of the power controller according to an exemplary embodiment of the present invention.

As shown therein, it is first determined whether there is an input or not. If there is no input, the input unit changes to a standby state. If there is an input, the input unit changes to an operating state. After changing to the operating state, it is checked whether an object is focused. If the object is not focused, the operating state is changed into the standby state. If the object is focused, an operation of estimating the motion or the operating state is started. After starting the operation for estimating the motion or the operating state, it is determined whether the object moves continuously or not. If there is no continuous motion, the input unit changes to the standby state.

Thus, the present invention provides the low power input device, in which the light intensity is minimized in the standby state where there is no input, and the image sensor and the motion computing unit are controlled to consume the minimum power.

A low power image sensor and its integrated circuit may be used in an optical pointing device such as an optical mouse or a finger mouse, and may be used as an input unit for various mobile devices required to have a small size and consume low power.

Although a few exemplary embodiment of the present invention have been shown and described, it will be appreciated by those skilled in the art that changes may be made in these exemplary embodiments without departing from the principles and spirit of the invention, the scope of which is defined in the appended claims and their equivalents.

The invention claimed is:

1. A low power image sensor comprising:
    an image sensing unit which senses light from an object, converts the light into an electric signal, and outputs the electric signal; and
    a comparing unit which receives the electric signal from the image sensing unit, compares a voltage level of the electric signal with a reference voltage, and outputs an image signal as a 1 bit signal per pixel; and
    an effective image adjuster which compares bit value distribution of the image signal output from the comparing unit with a preset effective range, and adjusts the reference voltage to output an effective image.

2. The low power image sensor according to claim 1, wherein the effective image adjuster comprises:
    an effective image determiner which compares a preset effective range with a percentage of '1' or '0' of a bit signal included in an image signal corresponding to total pixels output from the comparing unit, and determines whether an image is effective or not by determining whether the percentage is within the preset effective range; and a reference voltage adjuster which adjusts the reference voltage if the effective image determiner determines that the image is ineffective.

3. The low power image sensor according to claim 2, wherein the effective image determiner comprises:
   a counter which counts the number of '0' or '1' of a 1 bit signal output from the comparing unit with respect to total pixels; and a digital comparator which performs comparison for determining whether the number of '0' or '1' counted by the counter is within a preset range for an effective image and determines whether the image is effective.

4. The low power image sensor according to claim 3, wherein the effective image determiner comprises:
   an integrator which integrates '0' or '1' of a 1 bit signal output from the comparing unit with respect to total pixels; and
   an analog comparator which performs comparison for determining whether the number of '0' or '1' integrated by the integrator is within a preset range for an effective image and determines whether the image is effective.

5. The low power image sensor according to claim 4, wherein the effective image determiner employs a charge pump instead of the integrator.

6. The low power image sensor according to claim 2, wherein the reference voltage adjuster comprises a means for determining which one of the numbers of '0' and '1' is higher than the other with respect to an 1 bit signal output from the comparing unit and corresponding to total pixels, and for stepwise adjusting the reference voltage up or down by N times applying a successive approximation register (SAR) method.

7. The low power image sensor according to claim 6, wherein the reference voltage adjuster comprises:
   a reference voltage up/down comparator which determines which one of the numbers of '0' and '1' is higher than the other with respect to a 1 bit signal output from the comparing unit and corresponding to total pixels, and decides which one of an up signal and a down signal will be output; and
   an N-to-$2^N$ decoder which stepwise changes the reference voltage up and down on the basis of the determination of the reference voltage up/down comparator.

8. The low power image sensor according to claim 6, wherein the effective image determiner determines whether the image is effective at every time of the SAR method while the reference voltage is adjusted by the N times SAR method.

9. The low power image sensor according to claim 6, wherein the effective image determiner determines whether the image is effective after completing the SAR method N times while the reference voltage is adjusted by the N times SAR method.

10. The low power image sensor according to claim 2, wherein the reference voltage adjuster determines which one of '0' and '1' is more than the other in a 1 bit signal output from the comparing unit with respect to total pixels, and changes the reference voltage up or down by a minimum unit of adjustment.

11. The low power image sensor according to claim 10, wherein the reference voltage adjuster comprises:
    a reference voltage up/down comparator which determines which one of the numbers of '0' and '1' is higher than the other with respect to a 1 bit signal output from the comparing unit and corresponding to total pixels, and decides which one of an up signal and a down signal will be output; and
    a voltage adjuster which changes the reference voltage up or down according to determination of the reference voltage up/down comparator.

12. The low power image sensor according to claim 2, wherein the reference voltage adjuster determines which one of the numbers of '0' and '1' is higher than the other with respect to a 1 bit signal output the comparing unit and corresponding to total pixels, and continuously changes a reference voltage up or down.

13. The low power image sensor according to claim 12, wherein the reference voltage adjuster comprises:
    a reference voltage up/down comparator which compares a reference value with a value obtained by integrating '0' and 1'1 of a 1 bit signal output from the comparing unit with respect to total pixels, and decides which one of an up signal and a down signal will be output; and
    a charge pump which adjusts a reference voltage through charging or discharging according to determination of the reference voltage up/down comparator.

14. The low power image sensor according to claim 1, wherein the image sensing unit comprises:
    a pixel array to sense light from an object and convert the light into the electric signal; and
    a selector to select a voltage signal of each pixel of the pixel array by a unit of row or column and transmit the selected signal to the comparing unit.

15. The low power image sensor according to claim 2, further comprising a shutter controller which adjusts an operating frequency of a selector of the image sensing unit to adjust integration time of light incident to a pixel array.

16. An integrated circuit comprising the low power image sensor according to claim 1 and integrated on a single chip.

* * * * *